United States Patent Office 3,716,829
Patented Feb. 13, 1973

3,716,829
APPARATUS FOR AND METHOD OF TREATING SEISMIC DATA HAVING ATTENUATED HIGH FREQUENCIES
William H. Ruehle, Duncanville, Tex., assignor to Mobil Oil Corporation
Filed Oct. 30, 1970, Ser. No. 85,631
Int. Cl. G01v 1/36
U.S. Cl. 340—15.5 DP                        8 Claims

ABSTRACT OF THE DISCLOSURE

A computer apparatus for and computer performed method of correcting a seismic trace by restoring attenuated high frequency components. The seismic trace is successively trunacted, each of the successive truncations is successively Fourier analyzed, and each center frequency of the successive Fourier analyses is computed. The resulting center frequency function is subjected to smoothing and difference operations followed by insertion of frequency components characteristic of an idealized shot pulse. The corrected seismic trace is then obtained by Fourier synthesis.

BACKGROUND OF THE INVENTION

This invention relates to treating seismograms wherein high frequency reflections are attenuated.

One of the errors inherent in a seismic trace obtained by conventional seismic exploration is a frequency shift with time. This error is due to the fact that higher frequency seismic signals are attenuated at a faster rate than lower frequency seismic signals. As a result, the earlier recorded seismic reflections, which represent the shallow subsurface formations, have a higher mean frequency than the later recorded seismic reflections which represent the deep subsurface formations. Consequently, the reflections from the deep subsurface are of a lower center frequency than the reflections from the shallow subsurface, and the resolving power of the seismic trace for these deep reflections is less than the resolving power of the seismic trace for the shallow reflections. The existence of this frequency shift with time has led to the use of time varying filters for processing seismic data such as described in Pat. No. 3,281,776, Ruehle.

SUMMARY OF THE INVENTION

In accordance with one aspect of the present invention, a method of and apparatus for treating seismic traces wherein high frequency seismic reflections are attenuated are provided. Each seismic trace is treated by successively truncating each trace, successively Fourier analyzing the successive truncations of the seismic trace, and computing the center frequencies of the successive Fourier analyses. A function representing the center frequency of the seismic trace is generated. Thereafter, smoothing and difference operations are performed on the function followed by insertion of frequency components characteristic of an idealized shot pulse. A corrected seismic trace is then Fourier synthesized.

BRIEF DESCRIPTION OF THE DRAWINGS

For a more detailed explanation of the invention and the foregoing aspects as well as others, reference may be made to the following description taken in conjunction with the drawings wherein.

DESCRIPTION OF THE PREFERRED EMBODIMENT

Figure 1A:
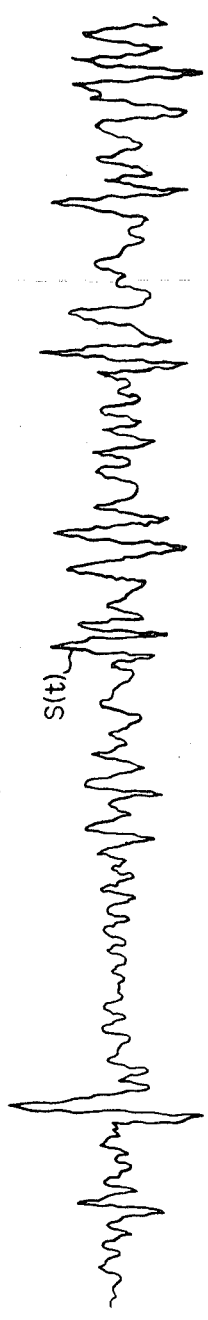
FIG. 1a is a trace of seismic reflections characteristic of a seismogram with the high frequency reflections attenuated.
Figure 1B:
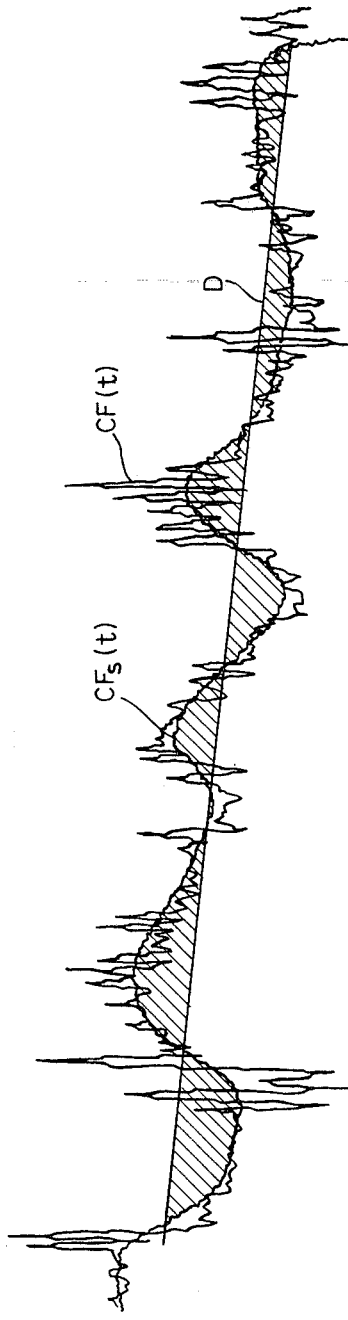
FIG. 1b is a combined waveform representing a center frequency function having a frequency shift with time and a smoothed center frequency function.

FIG. 1a illustrates a seismic trace $s(t)$ where the amplitude of seismic reflections are plotted as a function of time with the horizontal axis representing time and the vertical axis representing amplitude. The seismic trace $S(t)$ represents raw seismic data displayed by a conventional seismogram, that is a seismogram obtained by conventional exploration techniques, with the high frequency reflected energy attenuated. A center frequency function $CF(t)$ of FIG. 1b is obtained by successive truncations of the seismic trace $S(t)$, successive Fourier analyses of the successive truncations, and successive computation of the center frequencies of the successive analyses. The function $CF(t)$ represents the frequency of the center frequency components as a function of time with the horizontal axis representing time and the vertical axis representing frequency.

Figure 1C:
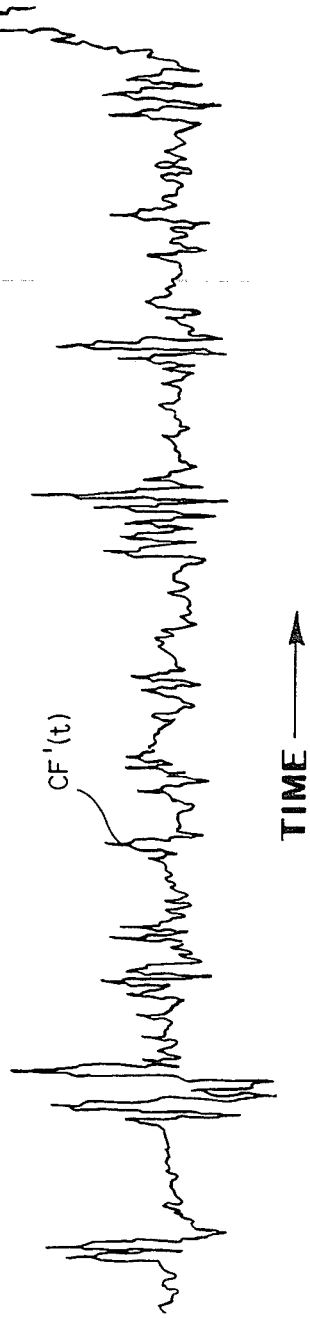
FIG. 1c is a waveform representing the center frequency function of FIG. 1b without a frequency shift with time.

The function $CF_s(t)$ which is also shown in FIG. 1b represents an averaging or smoothing of the function $CF(t)$. It may be seen by examining the function $CF(t)$ and $CF_s(t)$ that there is an overall frequency shift with time. This frequency shift which results from the attenuation of high frequency reflections is displayed by an increasing average displacement D of the functions $CF(t)$ and $CF_s(t)$ below a baseline represented by $f_{c_0}$. A function $CF'(t)$ of FIG. 1c is identical to the function $CF(t)$ except that the frequency shift with time, represented by $CF_s(t)$ is removed. Accordingly, there is no longer an increasing average displacement of the function $CF'(t)$.

The use of the functions $CF(t)$ and $CF'(t)$ in treating the uncorrected seismic trace $S(t)$ to obtain the corrected seismic trace $S'(t)$ and the way in which the functions $CF(t)$ and $CF'(t)$ are obtained will now be discussed in some detail.

Figure 2:
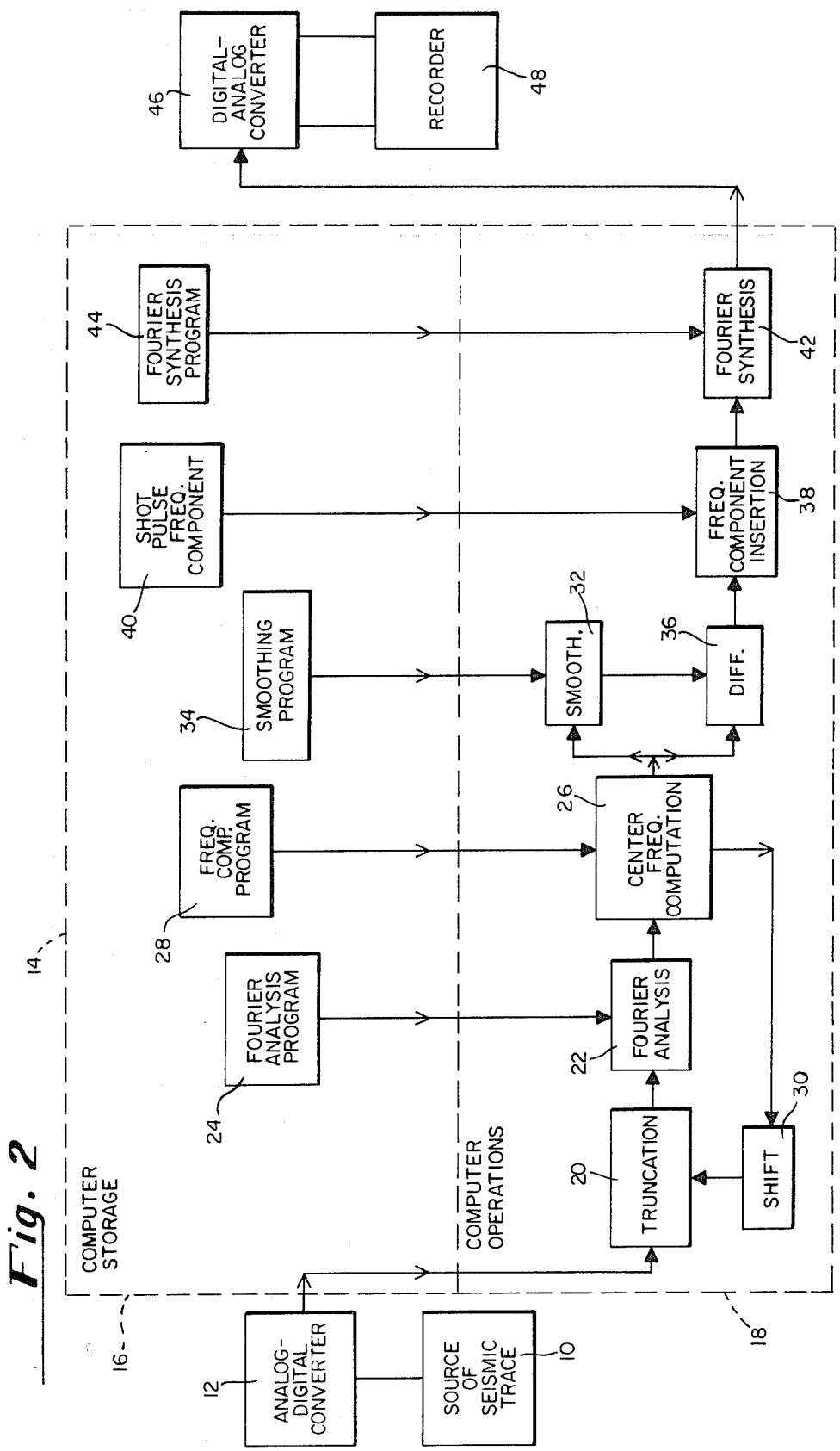
FIG. 2 is a schematic representation of an apparatus for and method of treating seismic data.

Referring now to FIG. 2, an analog representation of the seismic traces $S(t)$ is obtained from a source 10. In order to obtain a digital representation suitable as an input to a digital computing apparatus, the analog representation of the seismic trace $S(t)$ is applied to an analog-to-digital converter 12. The output of the converter 12 is then applied as the input to an automatic digital computer 14. Alternatively, it is common to record the seismic traces directly in digital form in the field.

Initially, the digital representation of the trace $S(t)$ is applied to a storage section 16 of the computer 14. At an appropriate time, the digital representation of the seismic trace $S(t)$ is applied to an operations section 18. In general, the operations section 18 performs various operations on the physical representations of the input, in effect treating the seismic data of the seismic trace $S(t)$ in accordance with the various programs stored in the storage section 16.

The first series of operations in the operations section 18 is directed to obtain the function $CF(t)$ from the seismic trace $S(t)$. Truncation of the seismic trace $S(t)$, to obtain a window along the horizontal time axis of FIG. 1a, is performed by a truncation means 20. The window of the seismic trace $S(t)$ is then Fourier analyzed by a Fourier analysis means 22 under the control of a Fourier analysis program 24 in the storage section 16. Subsequently, the frequency of the center frequency component for each Fourier analysis is computed at a center frequency computation means 26 under the control of a frequency computation program 28 in the storage section 16. The computation program 28 includes appropriate instructions to carry out the computation $$\frac{\Sigma f_i |A_i|}{\Sigma |A_i|}$$

which equals the center frequency $f_c$ where $A_i$ equals the amplitude of each of the frequency components and $f_i$ equals the frequency of each of the frequency components in the window of the seismic trace. By repeating each of the operations in this first series over different intervals or windows along the time axis of FIG. 1a under the control of a window shift means 30, the frequency of the center frequency component for successive Fourier analyses of successive truncations of the seismic trace may be obtained. When all of the frequencies of the center frequency components are combined, the center frequency function $CF(t)$ is obtained.

By smoothing the function $CF(t)$, the high frequency components corresponding to reflectivity and low frequency oscillations arising from the system are removed to leave a function $CF_s(t)$ representative of the frequency shift with time only. The smoothed function $CF_s(t)$ is shown in FIG. 1b. The smoothing of the function $CF(t)$ is provided by a smoothing means 32 under the control of a smoothing program 34 in the storage section 16.

Subtraction of the function $CF_s(t)$ representing the frequency shift with time from the function $CF(t)$ then yields the function $CF'(t)$. The necessary subtraction is performed at a difference means 36. The function $CF'(t)$, which has no frequency shift with time, is shown in FIG. 1c.

The next series of operations in the operations section 18 is directed to the synthesis of the corrected seismic trace $S'(t)$ with the attenuated high frequency components restored. Frequency components corresponding to an idealized shot pulse are first inserted at an insertion means 38 under the control of a shot pulse frequency component program 40. At the insertion means 38, the shot pulse frequency extending over a period $\Delta T$ are combined with the function $CF'(t)$ at overlapping windows extending from $t_1 - \Delta T/2$ to $t_1 + \Delta T/2$ for various values of $t_1$. After conversion to an analog representation at a digital-to-analog converter 46, the seismic trace $S'(t)$ with the attenuated high frequency components restored may be displayed at a recorder 48.

The invention has been described in mathematical terms with repeated references made to data and functions. However, the data and functions are actually physical representations such as the state of a flip-flop or the magnitude of an electrical signal. Accordingly, the method and apparatus described operate on the physical representations of the data and functions and not on the data and functions as such.

While the method of the present invention can be practiced with the use of several well-known types of computing apparatus, the method is particularly suitable for use with a general purpose digital computer.

Digital computer programs for performing Fourier analysis and Fourier synthesis are well known. Particularly good examples are described in the following: "Three Fortran Programs That Perform the Cooley-Tukey Fourier Transform," by N. M. Brenner, M.I.T. Lincoln Laboratory, Group 31, Technical Note 1967-2, July 28, 1967. This article describes programs for both the Fourier analysis 22 and the Fourier synthesis 42.

One particular computing system which is suitable for use is supplied by the Control Data Corporation under the general model designation 6600, and includes the following components:

6404 Central Computer, 65K Memory
6638 Disc System
6602 Console Display
6681 Data Channel Converter
3228 Magnetic Tape Controller
607 Magnetic Tape Transport
3447 Card Reader Controller
405 Card Reader
3256 Line Printer Controller
501 Line Printer

What is claimed:

1. An automatic computer performed method for use in restoring high frequency reflections in a seismic trace comprising the following steps:
   generating a physical representation within the computer representing the trace of seismic reflections;
   generating a physical representation within the computer representing successive truncations of the seismic trace;
   generating a physical representation within the computer representing the successive Fourier analyses of the successive truncations;
   generating a physical representation within the computer representing the frequency of the center frequency components of said successive Fourier analyses as a function of time; and
   generating a physical representation within the computer representing the shift in frequency of the center frequency components as a function of time.

2. The computer performed method of claim 1 wherein the generated physical representation of the frequency shift function represents smoothing the center frequency function to remove high frequency oscillations corresponding to reflectivity and low frequency system oscillations.

3. The computer performed method of claim 2 further comprising the step of generating a physical representation within the computer representing subtracting the frequency shift funtcion from the center frequency function to obtain a shift corrected center frequency function.

4. The computer performed method of claim 3 further comprising the step of generating physical representations within the computer representing Fourier synthesizing windows of the shift corrected center frequency function to obtain a corrected seismic trace with high frequency components restored.

5. The computer performed method of claim 4 comprising the step of generating physical representations within the computer representing insertion of the frequency components corresponding to an idealized shot pulse into each of the windows of the shift corrected center frequency function before Fourier synthesis.

6. An automatic computing apparatus for treating data of a seismic trace comprising:
   means for successively truncating the reflection energy function represented by the seismic trace;
   means for successively Fourier analyzing the successive truncations;
   means for successively computing the frequency of the center frequency components of the respective Fourier analysis; and
   means for generating a center frequency function corresponding to the successively computed frequency of the center frequency components.

7. The computing apparatus of claim 6 including
   means for smoothing said center frequency function;
   means for subtracting the smoothed center frequency function from the center frequency function to derive a center frequency function without a frequency shift resulting from attenuation of high frequency reflections; and
   means for Fourier synthesizing an attenuation corrected seismic trace from the center frequency function without a frequency shift.

8. The computing apparatus of claim 7 wherein said means for synthesizing said attenuation corrected seismic trace includes means for inserting frequency components of an idealized shot pulse into the center frequency function without a frequency shift.

References Cited

UNITED STATES PATENTS

| | | | |
|---|---|---|---|
| 3,274,542 | 9/1966 | Ruehle | 340—15.5 |
| 3,541,458 | 11/1970 | Kluno | 328—165 |

OTHER REFERENCES

Nepon, "Digital ⅓ Octave Spectral Analysis" October 1966, pp. 605–614, J.A.C.M., vol. 13, No. 4.

George, "Application of Inverse Convolution Techniques, etc.," November 1962, pp. 2313–2319, I.R.E., vol. 50.

Singleton et al., "Spectral Analysis, etc.," June 1967, pp. 104–113, IEEE Transactions, vol. AU–15, No. 2.

BENJAMIN A. BORCHELT, Primary Examiner

N. MOSKOWITZ, Assistant Examiner

U.S. Cl. X.R.

340—15.5 TC, 15.5 F, 172.5; 324—77; 235—156